(12) United States Patent
Shen et al.

(10) Patent No.: US 10,792,963 B2
(45) Date of Patent: Oct. 6, 2020

(54) TIRE SENSOR FILTER

(71) Applicant: Doran Manufacturing LLC, Cincinnati, OH (US)

(72) Inventors: Jie Shen, Shanghai (CN); Jeffrey Stegman, Cincinnati, OH (US); James Clifford Samocki, Cincinnati, OH (US)

(73) Assignee: DORAN MANUFACTURING LLC, Cincinnati, OH (US)

( * ) Notice: Subject to any disclaimer, the term of this patent is extended or adjusted under 35 U.S.C. 154(b) by 492 days.

(21) Appl. No.: 15/620,096

(22) Filed: Jun. 12, 2017

(65) Prior Publication Data
US 2018/0354321 A1  Dec. 13, 2018

(51) Int. Cl.
*B60C 29/06* (2006.01)
*B01D 46/00* (2006.01)

(52) U.S. Cl.
CPC .......... *B60C 29/06* (2013.01); *B01D 46/0005* (2013.01)

(58) Field of Classification Search
CPC ............................ B01D 46/0005; B60C 29/06
USPC ........................... 55/385.1, 385.3; 123/198 E
See application file for complete search history.

(56) References Cited

U.S. PATENT DOCUMENTS

| | | | |
|---|---|---|---|
| 6,764,593 B1* | 7/2004 | Pace | B01D 46/0005 210/435 |
| 2017/0009922 A1* | 1/2017 | Hsu | F16L 37/105 |
| 2018/0009278 A1* | 1/2018 | Foor | B60C 23/003 |
| 2018/0339562 A1* | 11/2018 | Liu | B60C 29/06 |

* cited by examiner

*Primary Examiner* — Minh Chau T Pham
(74) *Attorney, Agent, or Firm* — Dinsmore & Shohl LLP

(57) ABSTRACT

The filter assembly is positioned between an outwardly threaded stem of a tire valve that controls the flow of tire gas and an internally threaded stem-receiving mount on a tire gas sensor. The filter assembly includes a housing having relatively opposing first and second ends, a mount-engaging portion adjacent to said first end, a cavity open at said first end, a stem-engaging stub at the second end, and at least one port extending through the stub and into the cavity; a filter insertable in the cavity; and a retainer mountable in the cavity at the first end of the housing and having a bore extending therethrough. The stub at the second end of the housing is disposed to depress the tire valve stem and release tire gas when the filter assembly and the tire valve stem are fully threaded into the mount on the sensing device. The tire gas flows through the port in the stub, the filter, and the bore in the retainer before reaching the sensing device.

20 Claims, 3 Drawing Sheets

TIRE SENSOR FILTER

BACKGROUND

Before a tire is installed on a very large vehicle, such as a mining truck or earth mover, a rim solution is typically applied within the tire. This product assists in installing and removing the tire, provides traction and controls heat. Unfortunately, rim solutions interfere with the performance of heat and pressure sensors on the tire. Such sensors, when functioning properly, contribute to the longevity of these huge and expensive tires. In addition to the adverse effect of rim solution and other liquids on the sensors, dirt, sand and other particulate matter within the tire can lead to sensor failure. The present tire sensor filter is designed to alleviate the foregoing problems.

SUMMARY

The filter assembly is positionable between an outwardly threaded stem of a tire valve that controls the flow of tire gas and an internally threaded stem-receiving mount on a device for sensing a property of said tire gas. The assembly comprises a housing, a filter element and a stopper. The housing has relatively opposing first and second ends, a mount-engaging portion adjacent to the first end, a cavity open at the first end, a stem-engaging stub at the second end, and at least one port extending through the stub and into the cavity. The filter element is insertable in the cavity. The stopper is mountable in the cavity at the first end of the housing and has a bore extending therethrough.

DESCRIPTION OF AN EXEMPLARY EMBODIMENT

Figure 1:
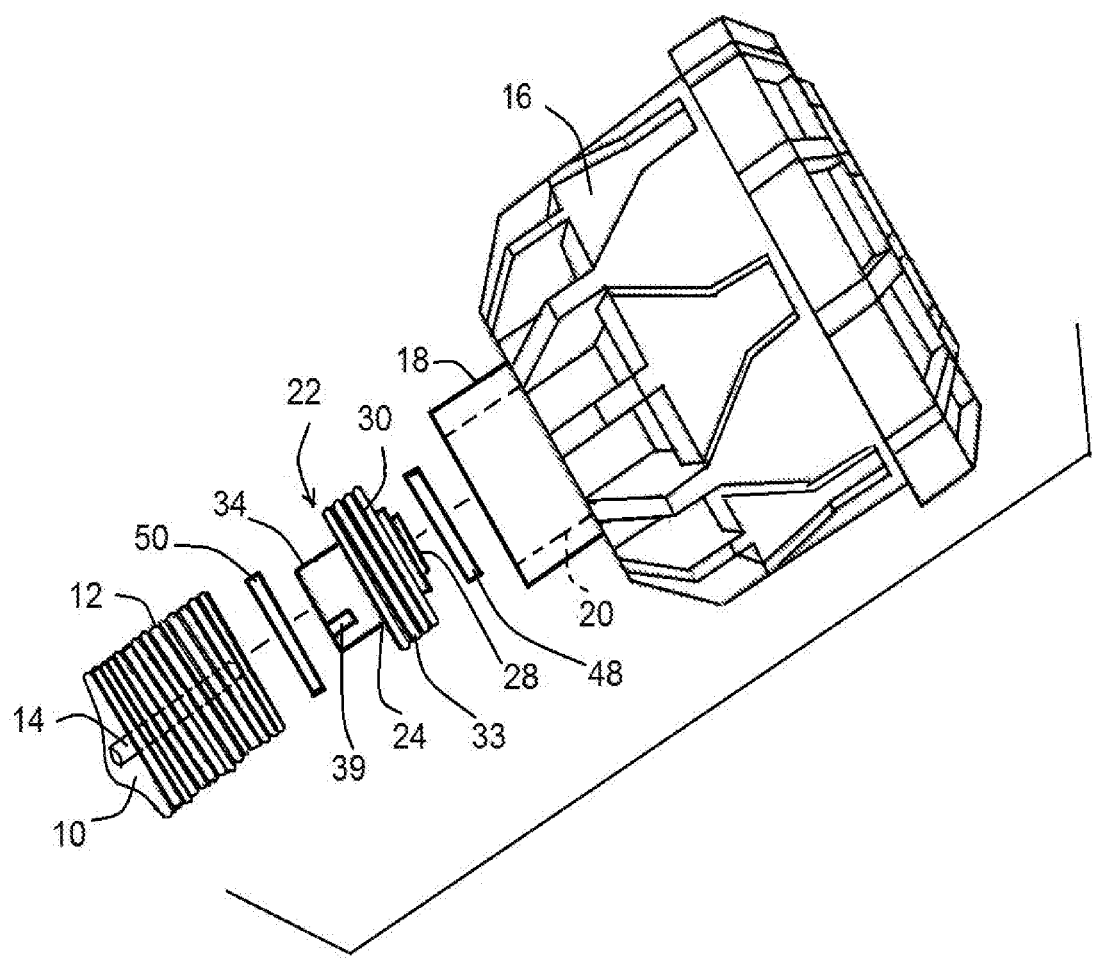
FIG. 1 is an exploded view of a tire valve stem, an embodiment of the filter assembly and a sensing device.
Figure 2:
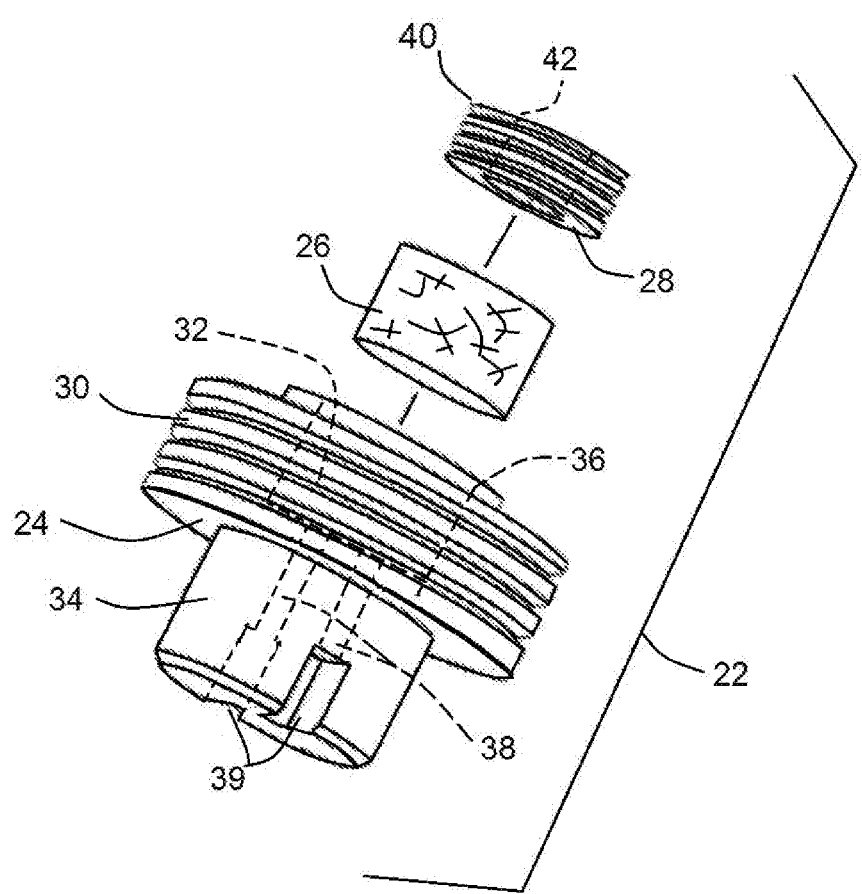
FIG. 2 is an exploded view of a housing, filter element and stopper comprising the filter assembly.
Figure 3:
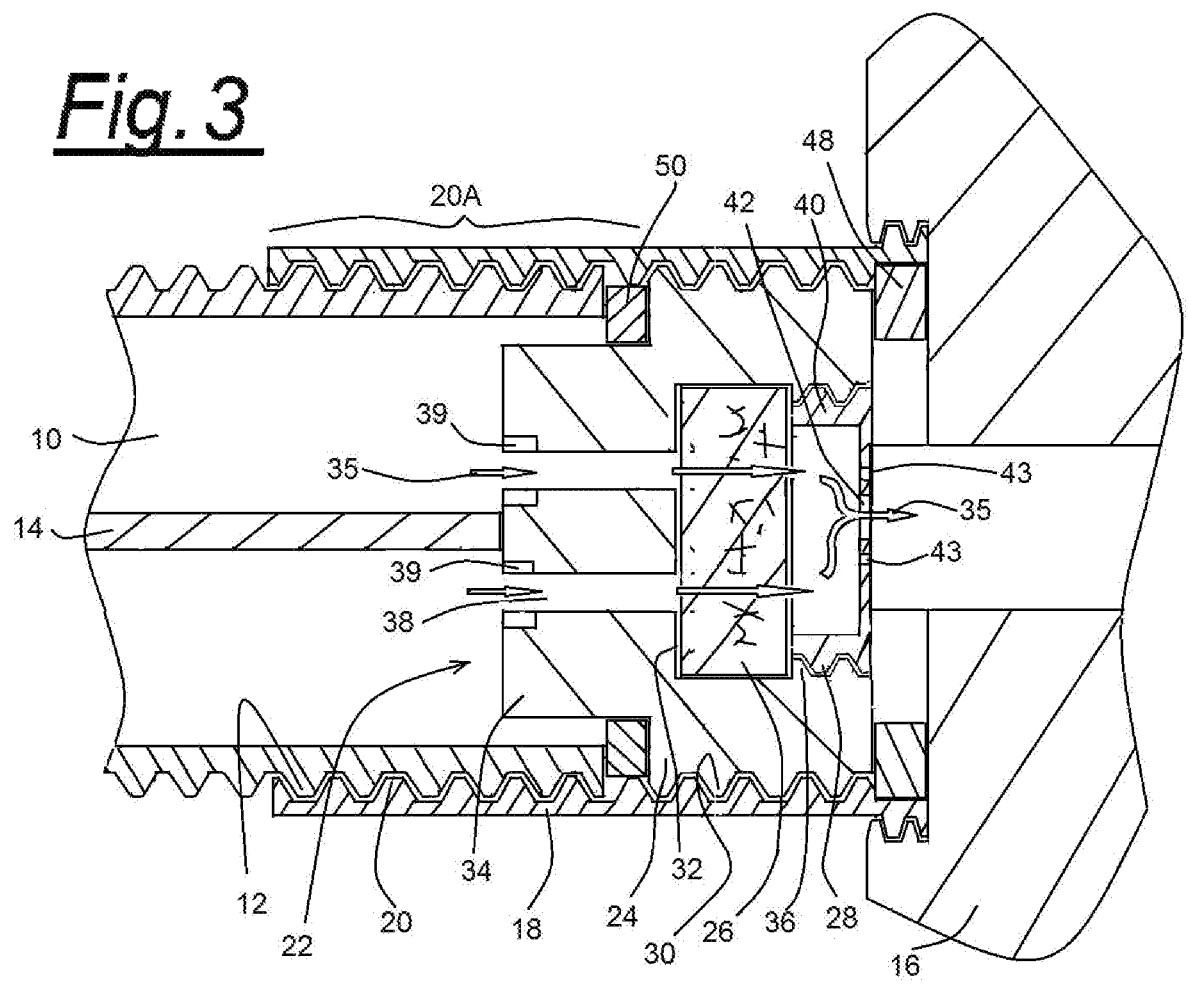
FIG. 3 is an enlarged sectional view of the tire valve stem, filter assembly and sensing device in an assembled arrangement.

A tire valve stem 10 is typically provided with external threads 12 and a valve pin 14 that, when depressed, enables air or other gas 35 to pass through the stem and into or out of a tire. An electronic sensing/transmitting device 16, such as an air pressure sensor, is typically equipped with a mount 18 having internal threads 20 adapted to engage the outwardly threaded tire stem 10. Normally, by screwing the sensor 16 tightly onto the tire stem 10, the valve pin 14 is depressed, and air 35 escapes from the tire, passes through the stem and into the sensor. However, in the present instance, a filter assembly, generally designated 22, may be interposed between the tire stem 10 and the sensing/transmitting device 16.

The filter assembly 22 may comprise a housing 24, a filter element 26 and a ported retainer 28. The housing 24 may be formed with a mount-engaging, threaded boss 30, a filter-receiving cavity or bore 32 open at a first end of the housing and a stem-engaging stub 34 at an opposite end of the housing. The threaded boss 30 is sized to engage the internal threads 20 on the sensor mount 18. The open end 36 of the filter-receiving cavity is provided with internal threads sized to engage the retainer 28. The stub 34 is sized to project into the tire stem 10 and engage the valve pin 14 so that tire gas 35 can be released. At least one, and preferably two, ports 38 extend through the stub to the filter-receiving cavity 32 so that the tire gas 35 reaches the filter 26. The filter is adapted to absorb moisture and block particulate matter before the tire gas reaches the sensor 16. The retainer 28 has external threads 40 that engage the internal threads of the open end 36 of the cavity and is formed with a central bore 42 so that the tire gas passing through the filter reaches the sensor. Diametrically opposing notches 43 or a crosspiece may be formed on an outer end of the retainer 28 to receive a tool (not shown) for rotating the stopper fully into the recess 36.

Once the filter 26 and the retainer 28 have been properly positioned therein, the filter assembly 22 may be screwed into the sensor mount 18. A front gasket 48 may be provided for an air tight seal therebetween. The stub 34 may be formed with diametrically opposing notches 39 adjacent to the ports 38. A tool (not shown) may be formed with tines that can be inserted into the notches 39 and then rotated to tighten the threaded filter assembly 22 against the front gasket 48 and the sensor mount 18.

Once the filter assembly 22 has been screwed fully into the sensor mount 18, a substantial portion 20A of the mount's internal threads are still available to engage the external threads 12 of the tire valve stem 10, thereby securing the sensor and filter assembly to the stem. A rear gasket 50 may be mounted on the stub 34 to provide an air tight seal between the tire stem 10, sensor mount 18 and the filter assembly 22.

The sensor filters may be changed collectively on a scheduled, preventive maintenance basis, or individually when one becomes too clogged to operate efficiently. If, for instance, the monitor that receives and displays sensor readings indicates that it is no longer receiving signals from a particular sensor, it may be time to change the filter.

While a single embodiment of the invention has been described and illustrated in some detail, this disclosure is not intended to unduly limit or restrict the scope of the following claims.

The invention claimed is:

1. A filter assembly positionable between an outwardly threaded stem of a tire valve, said valve controlling the flow of tire gas, and an internally threaded stem-receiving mount on a device for sensing a property of said tire gas, said filter assembly comprising:
   a housing having relatively opposing first and second ends, a mount-engaging portion adjacent to said first end, a cavity open at said first end, a stem-engaging stub at the second end, and at least one port extending through the stub and into the cavity;
   a filter insertable in the cavity; and
   a retainer mountable in the cavity at the first end of the housing and having a bore extending therethrough.

2. The filter assembly of claim 1, wherein the mount-engaging portion of the housing is an externally threaded boss engageable with the internally threaded mount on the sensing device.

3. The filter assembly according to claim 2, wherein the externally threaded boss is sized to leave a portion of the internally threaded mount on the sensing device available to receive the tire valve stem with said filter assembly fully threaded into said mount.

4. The filter assembly according to claim 3, wherein the stub at the second end of the housing is disposed to depress the tire valve stem and release tire gas with said filter assembly and said tire valve stem fully threaded into the mount on the sensing device.

5. The filter assembly according to claim 4, wherein the tire gas flows through the at least one port in the stub, the filter, and the bore in the retainer before reaching the sensing device.

6. The filter assembly of claim 1, wherein the filter-receiving cavity is internally threaded adjacent to the first end of the housing.

7. The filter assembly according to claim 6, wherein the retainer is formed with external threads engageable with the internal threads of the filter-receiving cavity.

8. A filter assembly comprising:
a housing having relatively opposing first and second ends, a mount-engaging portion adjacent to said first end, a cavity open at said first end, a stem-engaging stub at the second end, and at least one port extending through the stub and into the cavity;
a filter insertable in the cavity; and
a retainer mountable in the cavity at the first end of the housing and having a bore extending therethrough,
wherein the mount-engaging portion of the housing is an externally threaded boss engageable with an internally threaded mount on a sensing device.

9. The filter assembly according to claim 8, wherein the externally threaded boss is sized to leave a portion of the internally threaded mount on the sensing device available to receive a tire valve stem with said filter assembly fully threaded into a mount.

10. The filter assembly according to claim 9, wherein the stub at the second end of the housing is disposed to depress the tire valve stem and release tire gas with said filter assembly and said tire valve stem fully threaded into the mount on the sensing device.

11. The filter assembly according to claim 10, wherein the tire gas flows through the at least one port in the stub, the filter, and the bore in the retainer before reaching the sensing device.

12. The filter assembly of claim 8, wherein the cavity is internally threaded adjacent to the first end of the housing.

13. The filter assembly according to claim 12, wherein the retainer is formed with external threads engageable with the internal threads of the cavity.

14. An apparatus comprising:
a tire valve including an outwardly threaded stem, the tire valve controlling the flow of tire gas;
a sensing device for sensing a property of the tire gas, the sensing device including an internally threaded stem-receiving mount; and
a filter assembly positionable between the outwardly threaded stem and the internally threaded mount, the filter assembly comprising:
a housing having relatively opposing first and second ends, a mount-engaging portion adjacent to said first end, a cavity open at said first end, a stem-engaging stub at the second end, and at least one port extending through the stub and into the cavity;
a filter insertable in the cavity; and
a retainer mountable in the cavity at the first end of the housing and having a bore extending therethrough.

15. The apparatus of claim 14, wherein the mount-engaging portion of the housing is an externally threaded boss engageable with the internally threaded mount on the sensing device.

16. The apparatus according to claim 15, wherein the externally threaded boss is sized to leave a portion of the internally threaded mount on the sensing device available to receive the tire valve stem with said filter assembly fully threaded into said mount.

17. The apparatus according to claim 16, wherein the stub at the second end of the housing is disposed to depress the tire valve stem and release tire gas with said filter assembly and said tire valve stem fully threaded into the mount on the sensing device.

18. The apparatus according to claim 17, wherein the tire gas flows through the at least one port in the stub, the filter, and the bore in the retainer before reaching the sensing device.

19. The apparatus of claim 14, wherein the filter-receiving cavity is internally threaded adjacent to the first end of the housing.

20. The apparatus according to claim 19, wherein the retainer is formed with external threads engageable with the internal threads of the filter-receiving cavity.

* * * * *